United States Patent
Maurer et al.

(10) Patent No.: US 6,203,188 B1
(45) Date of Patent: Mar. 20, 2001

(54) MODULE FORMING PART OF A STATIC MIXER ARRANGEMENT FOR A PLASTICALLY FLOWABLE MATERIAL TO BE MIXED HAVING A CRITICAL DWELL TIME

(75) Inventors: Rudolf Maurer, Winterthur (CH); Joachim Studlek, Asslar (DE)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 09/155,195
(22) PCT Filed: Jan. 23, 1998
(86) PCT No.: PCT/CH98/00025
  § 371 Date: Sep. 23, 1998
  § 102(e) Date: Sep. 23, 1998
(87) PCT Pub. No.: WO98/33583
  PCT Pub. Date: Aug. 6, 1998

(30) Foreign Application Priority Data

Jan. 29, 1997 (EP) .................................................. 97810043

(51) Int. Cl.[7] ..................................................... B01F 5/00
(52) U.S. Cl. ........................................... 366/338; 366/336
(58) Field of Search ............................. 366/80, 336, 338, 366/340, 341

(56) References Cited

U.S. PATENT DOCUMENTS

| | | | |
|---|---|---|---|
| Re. 34,255 | * 5/1993 | Friedrich | 366/336 |
| 2,669,946 | * 2/1954 | Peyton | 366/340 |
| 4,049,241 | 9/1977 | Taniguchi | 366/336 |
| 4,249,877 | * 2/1981 | Machen | 366/336 |
| 4,478,516 | * 10/1984 | Kessler | 366/340 |
| 4,522,504 | * 6/1985 | Greverath | 366/338 |
| 4,685,514 | * 8/1987 | Brown | 138/38 |
| 4,692,030 | * 9/1987 | Tauscher et al. | 366/336 |
| 5,255,974 | * 10/1993 | Signer | 366/336 |

FOREIGN PATENT DOCUMENTS

| | | |
|---|---|---|
| 678284A5 | 8/1991 | (CH) . |
| 254337A1 | 2/1988 | (DE) . |
| 0154013A2 | 9/1985 | (EP) . |
| 2-223405 | * 9/1990 | (JP) ................ 366/336 |

* cited by examiner

Primary Examiner—Tony G. Soohoo
(74) Attorney, Agent, or Firm—Townsend and Townsend and Crew LLP

(57) ABSTRACT

The module is a part of a static mixer which is provided for a plastic, flowable, composition to be mixed which is critical with respect to the dwell time. The apparatus comprises a tubular housing in which arms are arranged. The arms are inclined with respect to the longitudinal axis of the housing; they cross each other substantially on a straight line perpendicular to the longitudinal axis. The module comprises a sleeve which can be pushed into the housing. The inner wall of the apparatus which conducts the composition being mixed is formed by the inner sides of the sleeves. The arms are formed in the shape of rods each having a tip directed opposite to the direction of movement of the mixing mass and a base fastened to the inner side of the sleeve. Each tip forms an intermediate space with respect to the inner wall of the apparatus.

15 Claims, 2 Drawing Sheets

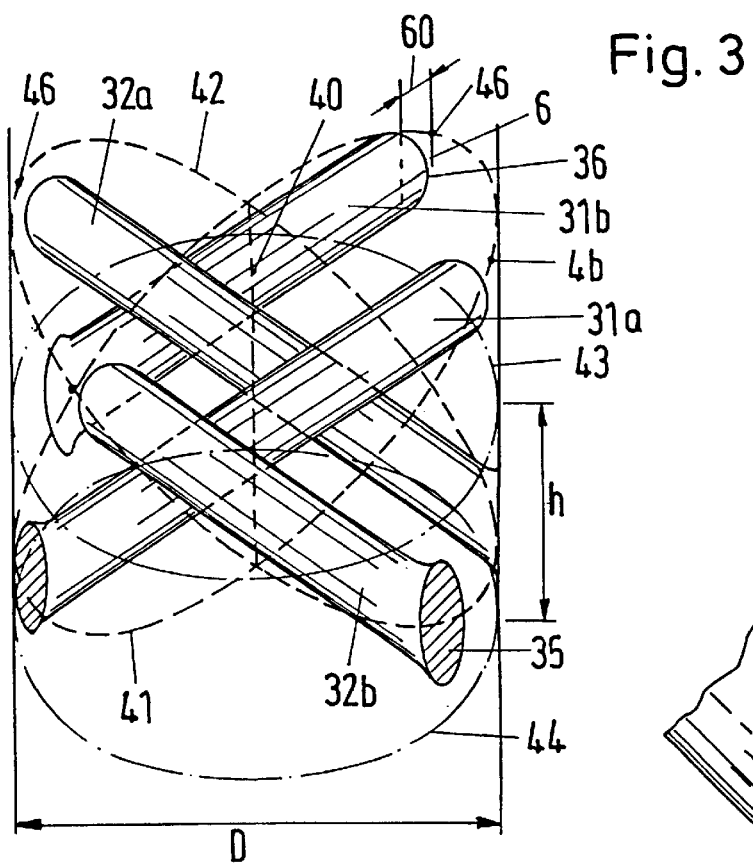
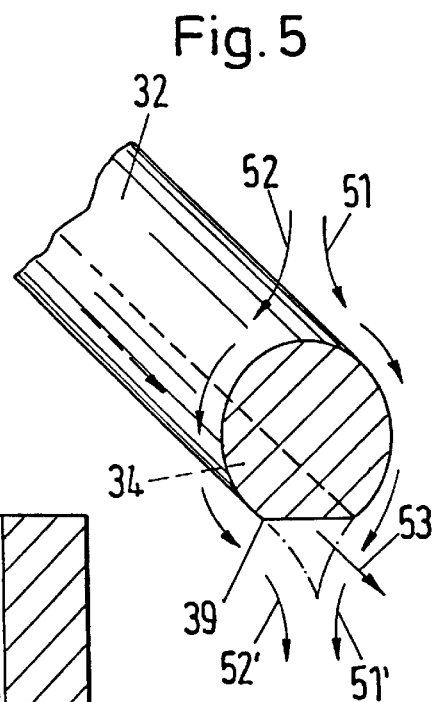
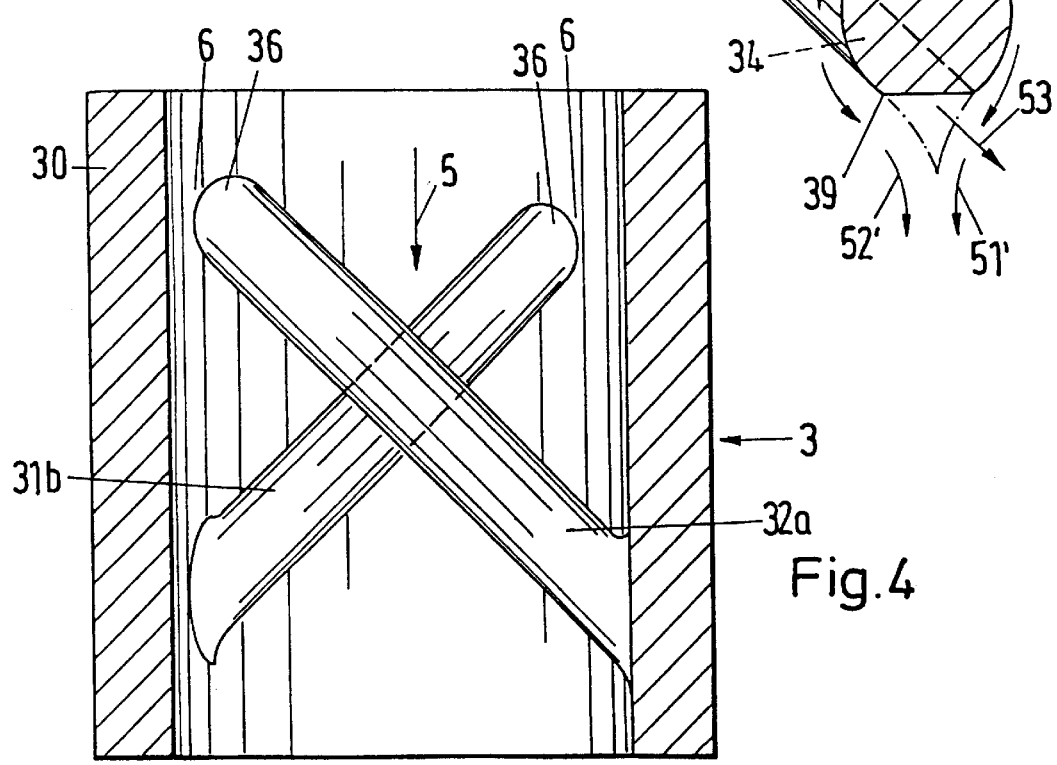

MODULE FORMING PART OF A STATIC MIXER ARRANGEMENT FOR A PLASTICALLY FLOWABLE MATERIAL TO BE MIXED HAVING A CRITICAL DWELL TIME

BACKGROUND OF THE INVENTION

1. Field of the Invention

The invention relates to a module for a static mixer for a plastic, flowable, composition to be mixed which is critical with respect to the dwell time. The invention refers further to a corresponding mixer and to uses of the mixer.

2. Description of the Prior Art

In the manufacture of shaped parts of hard PVC, PVC in granulate and/or powder form is mixed with lubricants, stabilizers and other additives and the mixture is then further treated in extruders to form a workable composition. During this, the mixture is heated up and compressed to a suitable working pressure. Twin screw extruders are advantageously employed. The intermediate product thus produced is, however, in a state which is still not sufficiently homogeneous for the manufacture of the shaped parts. Therefore, in many plants static mixers are arranged between the extruders and the molding dies or tools. In these mixers, the mixture is homogenized, and indeed—for the protection of the PVC polymers—at low shear velocities. PVC is, a thermoplast which can be worked above 160° C. It is however, not stable thermally, since hydrogen chloride already segregates at 140° C. In the manufacture of window sections of hard PVC, the plastic is processed at temperatures, between 190 and 200° C. At these temperatures the dwell time in the static mixer is rather critical. The dwell time can turn out to be so long at special locations within the static mixer that discolorations and losses in quality arise. As soon as such unfavorable phenomena set in, they increase very rapidly so that the manufacturing process must be interrupted. The static mixers must be cleaned before the process is continued.

SUMMARY OF THE INVENTION

The object of the invention is to further develop known static mixers in such a manner that more favorable conditions with respect to the dwell time are present and that a cleaning of the static mixer can be performed simply. This object is satisfied by a static mixer which has a modular mixer structure.

The module is a part of a static mixer which is provided for a plastic, flowable, composition to be mixed which is critical with respect to the dwell time. The apparatus comprises a tubular housing in which rods are arranged. The arms are inclined with respect to the longitudinal axis of the housing; they cross each other substantially on a straight line perpendicular to the longitudinal axis. The module comprises a sleeve which can be pushed into the housing. The inner wall of the device which conducts the mixing mass is formed by inner sides of the sleeve. The arms are formed in the shape of rods each having a tip or apex directed opposite to the direction of movement of the composition to be mixed and a base fastened to the inner side of the sleeve in each case. Each tip forms an intermediate space with respect to the inner wall of the device.

The module in accordance with the invention or a mixer assembled from such modules can also be used for the processing of latex/rubber or of another plastic flowable mass of a polymer which is critical with respect to the dwell time.

Other features and advantages of the present invention will be understood upon reading and understanding the detailed description of the preferred exemplary embodiments, found hereinbelow, in conjunction with reference to the drawings, in which like numerals represent like elements.

BRIEF DESCRIPTION OF THE DRAWINGS

FIG. 3 is an illustration of the geometry of the rods of the module in accordance with the invention, FIG. 4 is a longitudinal section through a module in accordance with the invention, and FIG. 5 is the flow conditions of the composition about a specially shaped rod.

DETAILED DESCRIPTION OF THE PREFERRED EXEMPLARY EMBODIMENTS

Figure 1:
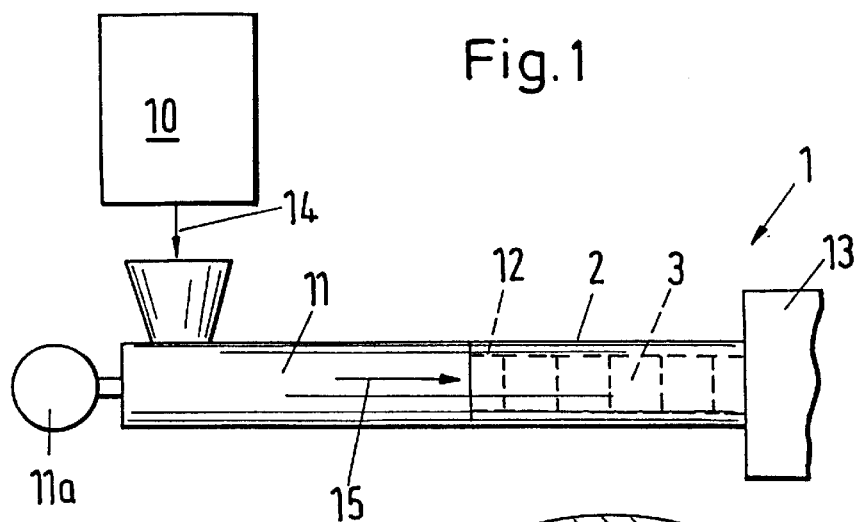
FIG. 1 is a schematic illustration of a plant for the manufacture of shaped parts of hard PVC.

The plant 1 in FIG. 1 comprises a screw extruder 11 (drive 11a) and a molding tool 13 lying downstream of it, with a mixer 2 being provided after the extruder 11. A part of the plant 10, in which the initially named mixture 14 of PVC particles, lubricants, stabilizers and other additives is produced, is placed ahead of the extruder 11. In the extruder 11, the mixture 14 is converted by heating and compressing to a mass 15 or composition which is then homogenized in the mixer 2 with modules 3 in accordance with the invention which are arranged in a housing 12. The homogenized mixed composition 16 is shaped into products such as, for example, window sections, in the die or molding tool 13.

Figure 2:
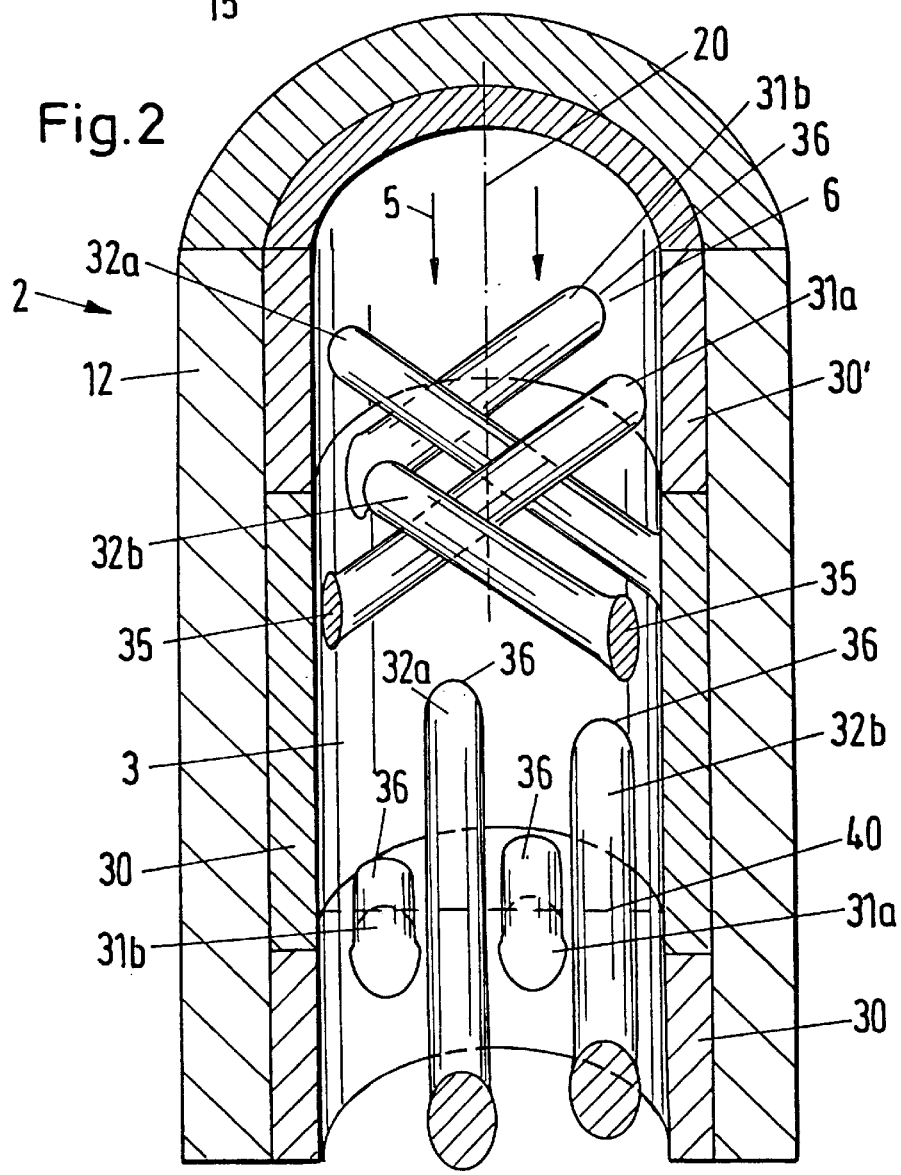
FIG. 2 is a section of a mixer with modules in accordance with the invention.

FIG. 2 shows a part of the longitudinally sectioned housing 12 of the mixer 2 with correspondingly sectioned sleeves 30, 30' of modules 3 in accordance with the invention. The arms 31a, 31b, 32a and 32b are drawn in full; they are partially located in front of the plane of the section. The arms are formed in the shape of rods, and indeed each having a tip 36 directed opposite to the direction of movement 5 of the composition being mixed and a base 35 fastened to the inner side of the sleeve. Each tip forms an intermediate space 6 with respect to the inner wall of the device 2.

The central module 3 shows its construction in full; in the adjacent modules only the lower part or the upper part respectively are illustrated. The sleeve piece 30' lying upwardly can be the lower part of a module or else also a sleeve which contains no arms which have a mixing function. The geometry of the central module 3 will be explained in more detail with reference to FIG. 3:

The arms 31a, 31b, 32a and 32b lie on two ellipses 41 and 42 which intersect one another. The line of intersection 40 is perpendicular to the longitudinal axis 20 of the housing 12 (see FIG. 2). The centerlines of the arms (not shown) intersect the ellipses at points 46. Intermediate spaces 6 each with a minimum width 60 are located in accordance with the invention between these points 46 and the rod tips 36. The arms are fastened at the base 35 to a cylindrical periphery of the sleeve 30—between the circles 43 and 44. The height h of this periphery is less than about half the inner diameter D of the sleeve 30.

Thanks to the intermediate spaces 6 at the rod tips 36, no stagnating accumulations of mixing mass form at these locations. A substantial improvement in the product quality results therefrom. The minimum width of the intermediate spaces 6 as measured in the radial direction must be greater than about 2 mm in each case. This width should not be chosen greater than about 6 mm since otherwise the mixing action would be too strongly impaired.

Uniformly shaped rounded features, which effect a favorable flow behavior of the mixing composition, are provided at the base 35 of the rods for the connection zone to the inner surface of the sleeve 30.

Contrary to the illustration of FIG. 2, adjacent rods can touch one another. In this case they can be connected, advantageously welded together, along the crossing line 40. The structure formed by the rods is reinforced by the connection so that it better withstands the pressure forces of the mixing mass.

The crossing lines 40 of the rods of adjacent modules 3 are oriented transversely with respect to one another; in particular they are—as shown in FIG. 2—rotated with respect to one another through 90°. This arrangement of the rods produces a good mixing action.

In order that the dwell times of the mixing mass are largely of equal length at all points in the mixing region, cross-sections are provided for the rods which are substantially circular or else elliptical. In an elliptical cross-section its major diameter should be perpendicular to the longitudinal axis 20 of the housing 12, and it should not be substantially greater than the minor diameter.

FIG. 4 shows a longitudinal section through a module 3 whose rods 31*b* and 32*a*—only those lying behind the plane of the section are shown here—are arranged completely within the sleeve 30. In the modules 3 of FIG. 2 the rods of a module project out of their sleeve 30 and protrude into a free space of an adjacent sleeve 30 or 30' respectively. The design of FIG. 2 is particularly advantageous with respect to a cleaning of the mixer apparatus 2, which as a rule must be carried out frequently.

The surfaces intended for contact with the mixing mass are advantageously coated. The cleaning is thereby facilitated and also the flow behavior and thus, the mixing process are improved. These advantages are particularly clearly pronounced if titanium nitrite (TN) is used as the coating material. Ceramic materials, in particular organically modified ceramic materials ("Ormocer": organically modified ceramics), are also suitable for the coating.

The downstream sides and/or the upstream sides of the rods can each have a longitudinal strip which is at least approximately made flat. With longitudinal strips of this kind an initially circular profile can, for example, be modified in such a manner that it acts in a manner similar to an elliptic cross-section. FIG. 5 shows a rod 32 with a planar longitudinal strip 34 at the downstream side. An improvement of the mixing action is striven for with this special forming, namely with respect to the following phenomenon, on which the mixing process in static mixers is partially based: The composition being mixed separates at the rod 32 into two partial flows 51 and 52 which approach each other again—partial flows 51' and 52'—at the downstream side. In this arrangement, a third partial flow 53, which flows along the rod 32, is embedded between the partial flows 51' and 52'. As a result of the strip 34, edges 39 are present on the rod surface which promote the release of the partial flows 51 and 52. An enhancement of the transverse flow 53 results therefrom and thus an improved mixing action.

The following points should be observed with respect to the design of the mixer apparatus 2 in accordance with the invention: Up to a diameter D=15 cm, 4 rods per module 3 are advantageous (see FIGS. 2 and 3). For greater diameters—up to 25 cm—6 rods are more suitable. The angle of inclination of the rods should amount to about 45°. In this case, the length of the module 3 is chosen to be of the same size as the diameter D. Four modules are advantageously provided as the number of the modules 3 in the mixer apparatus 2.

What is claimed is:

1. A module for a static mixer for a plastic flowable, composition to be mixed, which is critical with respect to the dwell time, the mixer comprising a tubular housing, the module comprising:

a sleeve that can be pushed into the tubular housing; and at least four arms that are arranged at an incline with respect to the longitudinal axis of the housing and cross substantially on a straight line perpendicular to the longitudinal axis, the arms being formed in the shape of rods each having a tip directed opposite to the direction of movement of the composition to be mixed and a base that is fastened to the inner side of the sleeve, each tip forming an intermediate space with respect to the inner side of the sleeve;

wherein the inner wall of the mixer that conducts the composition to be mixed is defined by the inner sides of the sleeve.

2. A module in accordance with claim 1 wherein in each case a minimum width of the intermediate spaces defined by the tips of the arms is greater than two millimeters when measured in a radial direction.

3. A module in accordance with claim 1 wherein a cross-section of each arm is substantially one of either circular or elliptical.

4. A module in accordance with claim 3 wherein the cross-section of each arm is elliptical, with the major diameter of the ellipse being perpendicular to the longitudinal axis of the housing and not being substantially greater than the minor diameter of the ellipse.

5. A module in accordance with claim 3 wherein at least one of downstream sides and upstream sides of the arms each have a longitudinal strip that is made at least approximately flat.

6. A static mixer for a plastic flowable, composition to be mixed, which is critical with respect to the dwell time, the mixer comprising a tubular housing and a plurality of modules, each module comprising:

a sleeve that can be pushed into the tubular housing; and at least four arms that are arranged at an incline with respect to the longitudinal axis of the housing and cross substantially on a straight line perpendicular to the longitudinal axis, the arms being formed in the shape of rods each having a tip directed opposite to the direction of movement of the composition to be mixed and a base that is fastened to the inner side of the sleeve, each tip forming an intermediate space with respect to the inner side of the sleeve;

wherein an inner wall of the mixer that conducts the composition to be mixed is defined by the inner sides of the sleeve;

wherein crossing lines of the arms of two neighboring modules are transversely disposed with respect to one another; and wherein the arms of a module project out of their module's respective sleeve and protrude into a free space of an adjacent sleeve.

7. A static mixer in accordance with claim 6 wherein the crossing lines of two neighboring modules are rotated with respect to one another by 90°.

8. A plant for the processing of plastic, flowable hard PVC or of another material which is critical with respect to the dwell time, the plant comprising a screw extruder and a molding tool lying downstream, and a static mixer located between the screw extruder and the molding tool, the mixer comprising a tubular housing and a plurality of modules, each module comprising:

a sleeve that can be pushed into the housing; and at least four arms that are arranged at an incline with respect to the longitudinal axis of the housing and cross substantially on a straight line perpendicular to the longitudinal axis, the arms being formed in the shape of rods each having a tip directed opposite to the direction of movement of the composition to be mixed and a base that is fastened to the inner side of the sleeve, each tip forming an intermediate space with respect to the inner side of the sleeve;

wherein an inner wall of the mixer that conducts the composition to be mixed is defined by the inner sides of the sleeve.

9. A module for a static mixer for a plastic flowable, composition to be mixed, which is critical with respect to the dwell time, the mixer comprising a tubular housing, the module comprising:

a sleeve that can be pushed into the tubular housing; and at least four arms that are arranged at an incline with respect to the longitudinal axis of the housing and cross substantially on a straight line perpendicular to the longitudinal axis, the arms being formed in the shape of rods each having a tip directed opposite to the direction of movement of the composition to be mixed and a base that is fastened to the inner side of the sleeve, each tip forming an intermediate space with respect to the inner side of the sleeve;

wherein the inner wall of the mixer that conducts the composition to be mixed is defined by the inner sides of the sleeve.

wherein the arm cross-section is substantially elliptical, with the major diameter of the ellipse being perpendicular to the longitudinal axis of the housing and not being substantially greater than the minor diameter of the ellipse; and wherein at least one of downstream sides and upstream sides of the arms each have a longitudinal strip that is made at least approximately flat.

10. A module for a static mixer for a plastic flowable, composition to be mixed, which is critical with respect to the dwell time, the mixer comprising a tubular housing, the module comprising:

a sleeve that can be pushed into the tubular housing; and at least four arms that are arranged at an incline with respect to the longitudinal axis of the housing and cross substantially on a straight line perpendicular to the longitudinal axis, the arms being formed in the shape of rods each having a tip directed opposite to the direction of movement of the composition to be mixed and a base that is fastened to the inner side of the sleeve, each tip forming an intermediate space with respect to the inner side of the sleeve;

wherein an inner wall of the mixer that conducts the composition to be mixed is defined by the inner sides of the sleeve; and wherein adjacent arms are connected to one another along a crossing line.

11. A module in accordance with claim 10 wherein the adjacent rods are welded.

12. A module for a static mixer for a plastic flowable, composition to be mixed, which is critical with respect to the dwell time, the mixer comprising a tubular housing, the module comprising:

a sleeve that can be pushed into the tubular housing; and at least four arms that are arranged at an incline with respect to the longitudinal axis of the housing and cross substantially on a straight line perpendicular to the longitudinal axis, the arms being formed in the shape of rods each having a tip directed opposite to the direction of movement of the composition to be mixed and a base that is fastened to the inner side of the sleeve, each tip forming an intermediate space with respect to the inner side of the sleeve;

wherein an inner wall of the mixer that conducts the composition to be mixed is defined by the inner sides of the sleeve; and wherein surfaces intended for contact with the composition to be mixed are coated.

13. A module in accordance with claim 12 wherein the surfaces intended for contact with the composition to be mixed are coated with one of titanium nitrite or a ceramic material.

14. A static mixer for a plastic flowable, composition to be mixed, which is critical with respect to the dwell time, the mixer comprising a tubular housing and a plurality of modules, each module comprising:

a sleeve that can be pushed into the tubular housing; and at least four arms that are arranged at an incline with respect to the longitudinal axis of the housing and cross substantially on a straight line perpendicular to the longitudinal axis, the arms being formed in the shape of rods each having a tip directed opposite to the direction of movement of the composition to be mixed and a base that is fastened to the inner side of the sleeve, each tip forming an intermediate space with respect to the inner side of the sleeve;

wherein an inner wall of the mixer that conducts the composition to be mixed is defined by the inner sides of the sleeve; and wherein crossing lines of the arms of two neighboring modules are transversely disposed with respect to one another.

15. A static mixer in accordance with claim 14 wherein the crossing lines to neighboring modules are rotated with respect to one another by 90°.

* * * * *